Oct. 29, 1935.                     J. E. ALLEN                       2,018,698
                        MACHINE FOR BAKING PIE CRUSTS
                              Filed Dec. 5, 1932
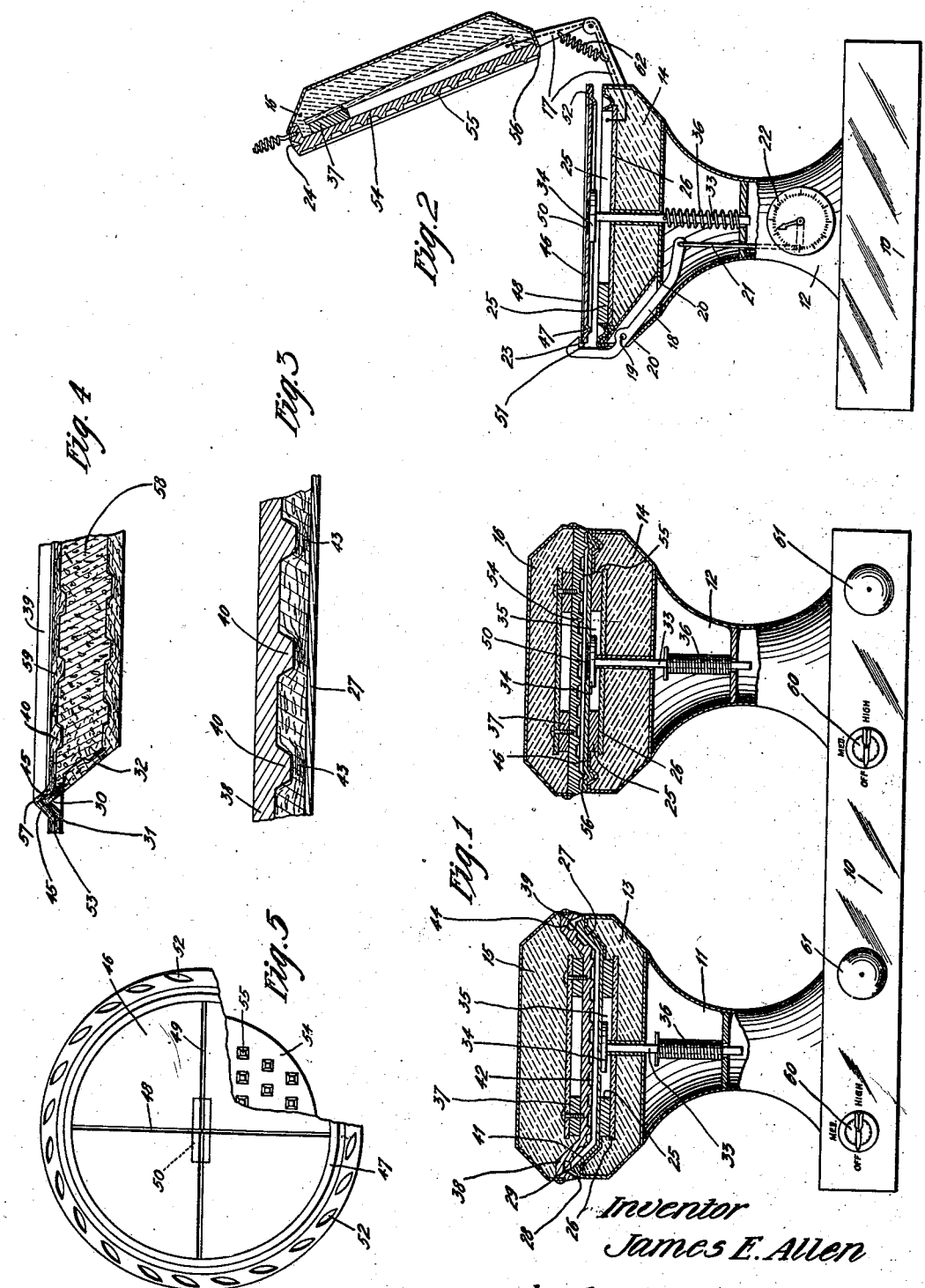
Inventor
James E. Allen
by Ornvig & Hague Attys.

Patented Oct. 29, 1935

2,018,698

UNITED STATES PATENT OFFICE 2,018,698

MACHINE FOR BAKING PIE CRUSTS

James E. Allen, Ames, Iowa

Application December 5, 1932, Serial No. 645,801

3 Claims. (Cl. 53—10)

The object of my invention is to provide a simple, durable and inexpensive machine for baking pie crusts, so constructed and arranged that the bottom and top crusts may be baked separately and at the same time, and before the filler is applied to the lower crust, thus providing a means whereby the crust may be baked immediately before serving, to which a previously prepared and heated filler may be applied.

More specifically it is the object of my invention to provide means whereby pie crusts may be rapidly baked, and at the same time produce a flaky and porous crust, which is tender and at the same time provided with sufficient mechanical strength to retain its shape when the filler is applied thereto.

A further object is to provide means whereby the bottom portion of the pie crust may be baked separately from the cover portion, said crusts being provided with means whereby the upper crust may be easily and quickly alined with the lower crust and whereby the upper crust will be mechanically supported in position on the lower crust sufficiently to prevent the upper crust from sliding off of the lower crust when filled.

A further object is to provide in a pie crust baking machine improved baking elements, whereby both the inner and outer surfaces of the crusts may be baked simultaneously by applying baking plates thereto.

A further object is to provide in a pie crust baking machine, employing upper and lower baking plates, and having means for locking the baking plates together, improved means whereby portions of the pie crust are permitted to expand while other portions of the crust are held against expansion, so that a very porous and flaky crust may be formed in its expanded portions, and whereby the contracted portions serve to unite or tie the flaky portions of the crust together.

My invention consists in the construction, arrangement and combination of the various parts of the device, whereby the objects contemplated are attained, as hereinafter more fully set forth, pointed out in my claims, and illustrated in the accompanying drawing, in which:

Figure 1 is a front view of my improved pie crust baking machine in which the baking ovens are shown in vertical cross section.

Figure 2 is an end view of same showing one of the baking ovens in vertical cross sections.

Figure 3 is an enlarged, detail, sectional view illustrating the upper and lower baking plates and the manner in which a pie crust is baked between the same.

Figure 4 illustrates a segmental sectional view of a completed pie employing crusts baked on my improved machine.

Figure 5 is a bottom view of the baking plates for baking the top crust, a portion of the lower plate being broken away to show the construction of the inner surface of the upper plate.

In the accompanying drawing, I have used the reference numeral 10 to indicate a base for supporting a pair of upright supports 11 and 12. The upper end of each of the supports is provided with lower oven sections 13 and 14. Hinged to the oven section 13 is an upper oven section 15 and hinged to the oven section 14 is an upper oven section 16. The upper oven sections are hinged to the lower oven sections by means of hinge portions 17. The upper oven sections are locked to their respective lower oven sections by means of latch devices 18.

Each latch device 18 is pivoted to a pin 19 secured to the corresponding upright. The lower end of the latch 18 extends through an opening 20 in said upright support and is pivotally connected to a link 21, which is operatively connected with an intermittent time clock 22. The upper end of the member 18 has a hook portion 23 for entering a notch 24 in the upper oven portion, whereby the upper oven may be manually locked to the lower oven, and automatically released by the time clock 22 when the oven members have been closed a predetermined length of time.

Each of the lower oven members 13 and 14 is provided with an electrical heating unit 25, said units being supported in suitable cavities 26 provided in the oven members. The oven member 13 is formed to support a pie pan 27.

The edge of said pan 27 has a flange portion 28 and an upwardly extending annular portion 29 designed to form an annular groove 30 in the lower edge of the outwardly extending flange portion 31 of the pie crust 32, as illustrated in Figure 4.

The lower oven is also provided with a vertically arranged shaft 33, the upper end of which is provided with a head 34, supported within an opening 35 formed in the heating element 25 and adapted to engage the under surface of the central portion of the pie pan. The shaft 33 is provided with a spring 36 to normally retain the shaft 33 and the member 34 in an elevated position, and to support the pie pan a considerable distance above the heating unit, when the upper oven member 25 is supported in an open position. Thus means is provided whereby the pie pan will be automatically lifted from the heating unit as soon as the upper oven member is released and moved to an open position.

The upper oven member 15 is provided with a heating unit 37. The inner surface of said oven member is provided with what I shall term an upper baking plate 38 formed to fit the contour of the inner surface of the pie pan 27. The member 38 has a downwardly extending annular flange 39 designed to overlap the flange 29 of the plate 27, and to overlap the outer edge of the flange 28 of said pie pan, whereby the edge of a pie crust placed between said plates may be trimmed evenly with the outer edge of the flange 28 when the upper oven member is moved to a closed position.

The inner surface of the plate 38 is provided with a series of inwardly projecting lugs 40, the inner ends of which are designed to engage the upper surface of the pie dough 41, after it has been placed in the pan 27, in the manner illustrated in Figure 1, so that spaces 42 are provided between the upper surface of the pie dough and the inner surface of the plate 38, in such a manner that when heat is applied to the pie pan and the plate 38, heat will be transmitted from said pan and plate to the dough to bake the same, causing steam to be generated in the dough, which in turn will cause that portion of the dough between the lugs 40 to expand in the manner illustrated in Figure 3, so that the dough is provided with a series of air pockets, causing the body of the crust to consist of a series of overlapping flakes, and at the same time provide a very tender crust having a considerable amount of thickness.

The upper layers of flakes are bent to fit the contour of the under surface of the plate 38 and converge to that portion 43 of the pie crust beneath the ends of the lugs 40, which is baked comparatively solid, due to the fact that no expansion of the dough is permitted between the pan 27 and the inner ends of the lugs 40. These comparatively solid portions 43 provide means for binding or tying the flaky portions together, and materially aid in giving the pie crust rigidity and strength without increasing the toughness of the same.

The plate 38 is so constructed that an annular groove 44 is provided near the base of the annular lug 39, which is supported immediately above the annular rib 29 and in spaced relation therewith, to form in the lower crust an upwardly extending annular flange 45, and the outwardly extending flange 31 before referred to.

The oven member 14 is provided with a plate 46 adapted to rest on the heating unit 25 in the manner illustrated in Figure 1, the plate being shown elevated in Figure 2 by means of the member 34. Said plate has an annular recess 47 near its peripheral edge. The plate 46 is also provided with radial flanges 48 and 49 which intersect each other at substantially right angles.

The central portion of the plate is provided with a die 50 by means of which the name of the filler to be placed in the crusts may be imprinted on the top surface of the upper crust. Said plate 50 is supported in the plate 46 in a detachable manner, so that any one of a number of dies may be placed in the plate at the will of the operator. That portion 51 of the upper surface of the plate outside of the groove 47 is provided with lugs or indentations 52 to cause imprints to be made in the flange portion 53 of the upper pie crust to produce a design in the flange 53 resembling that produced by hand work.

The upper oven 16 is provided with a baking plate 54, which is formed flat and has its under surface provided with downwardly extending lugs 55 similar to the lugs 40 and for the same purpose.

The outer edge of the under surface of said plate 54 is provided with an annular flange 56 designed to be supported immediately above the annular groove 47 to form an annular rib 57 to fit the upper surface of the rib 45 of the lower crust.

Thus means is provided whereby the upper and lower crusts may be baked separately, and after they have been baked a filler 58 may be placed in the said lower crust 32, after which the upper crust 59 may be placed in position with the flange 57 above the flange 45 in the manner illustrated in Figure 4. The flanges 45 and 57 support the upper crust against lateral movement. The filler 58 tends to provide means for securing the upper crust member in position by capillary attraction and adhesion.

Thus it will be seen that I have provided a very simple and comparatively inexpensive machine for baking the upper and lower crusts of a pie. The outer surfaces of the pie crusts when assembled are comparatively smooth while the inner surfaces of said crusts are corrugated.

It will further be seen that I have provided in the upper pie crust radial indentations 59 formed by the flanges 48 and 49 to assist in cutting the pie in equal parts. Any number of the flanges 48 and 49 may be used, depending upon the size of the pieces of pie desired.

It will further be seen that I have provided means whereby the pie crust may be baked rapidly and at the same time provide a porous, flaky and tender crust with sufficient strength to permit handling of the pie after the crusts have been filled.

It will further be seen that I have provided means whereby both the lower and upper pie crusts may be baked simultaneously. The heating elements are heated preferably by electricity, the current of which is controlled by means of suitable rheostats 60 secured to the base 10. Signal lights 61 are provided to indicate to the operator when the pie dough has been in the ovens the proper length of time to complete the baking, said lights being controlled by the clock 22.

The upper and lower ovens are automatically unlatched and separated by means of a spring 62 carried between the hinge member 17 when the latch device 23 has disengaged the notch 24. The pie pan 27 and the plate 46 are elevated by means of the springs 36 and the shafts 33 in the manner before described, in such a manner that even if the operator should not notice the signal, the pie crust will be moved out of engagement with the heating elements, in such a manner that the crust will not be burned, until the operator has time to remove the crust.

The crust is removed from the pan 27 and the plate 46 by removing said elements from the respective ovens, and placing them in an inverted position, after which the pan and plate may again be returned to their respective ovens. The plates 38 and 54 are permanently fixed to their respective ovens.

In the drawing I have illustrated the pie pan and the baking plate, together with the coacting upper plate members, used in connection with electrically heated ovens, with means for automatically opening said ovens when the baking has been accomplished. However, the said baking elements may be applied to any form of oven or used in the ordinary form of household range without departing from the spirit of my invention.

I claim as my invention:

1. A device for baking pie crust comprising a support; a heating element therein; a baking plate; means mounting the baking plate to move toward and from said heating element; yielding means for supporting the baking plate at its outer limit of movement; a cover pivoted to swing toward and from said baking plate; a heating element carried in said cover; a second baking plate carried by said cover and adapted to be moved to position adjacent to the first baking plate when the cover is moved to a closed position and to move the first baking plate toward the first heating element; and means for latching said cover in a closed position.

2. A device for baking pie crust comprising a support, a heating element therein; a baking plate adapted to be moved toward and from said heating element; yieldable means for moving the baking plate from said heating element; a cover member hinged to move toward and from the first baking plate; a heating element carried in said cover member; a baking plate adjacent to the outer surface of said heating element and adapted to be supported adjacent to the first baking plate when the cover member is moved to a closed position; yieldable means for moving the cover member to an open position; means for latching said cover member in a closed position; and time operated means for releasing said latching means.

3. A device for baking pie crust comprising a support; a heating element therein; a cover member mounted to move toward and from said heating element; a second heating element in said cover; a baking plate carried by said cover; a baking plate carried by the said support above the first heating element; a shaft slidably mounted to move vertically in such support having its upper end connected to said second baking plate; yielding means tending to move said shaft and baking plate upwardly; and means for limiting the upward movement of said shaft and baking plate.

JAMES E. ALLEN.